United States Patent
Jin et al.

(10) Patent No.: US 9,905,841 B2
(45) Date of Patent: Feb. 27, 2018

(54) CATHODE ACTIVE MATERIAL AND LITHIUM SECONDARY BATTERY INCLUDING THE SAME, AND METHOD OF MANUFACTURING CATHODE ACTIVE MATERIAL

(71) Applicant: LG Chem, Ltd., Seoul (KR)

(72) Inventors: Joo Hong Jin, Daejeon (KR); Dae Jin Lee, Daejeon (KR); Sun Sik Shin, Daejeon (KR); Woo Yeon Kong, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 14/907,659

(22) PCT Filed: Aug. 6, 2014

(86) PCT No.: PCT/KR2014/007255
§ 371 (c)(1),
(2) Date: Jan. 26, 2016

(87) PCT Pub. No.: WO2015/026080
PCT Pub. Date: Feb. 26, 2015

(65) Prior Publication Data
US 2016/0181593 A1    Jun. 23, 2016

(30) Foreign Application Priority Data

Aug. 22, 2013  (KR) .................... 10-2013-0099400

(51) Int. Cl.
| | |
|---|---|
| H01M 4/131 | (2010.01) |
| H01M 4/505 | (2010.01) |
| H01M 4/62 | (2006.01) |
| H01M 10/0525 | (2010.01) |
| H01M 4/525 | (2010.01) |
| H01M 4/04 | (2006.01) |
| H01M 4/1391 | (2010.01) |
| H01M 4/36 | (2006.01) |
| H01M 4/02 | (2006.01) |

(52) U.S. Cl.
CPC ......... *H01M 4/131* (2013.01); *H01M 4/0402* (2013.01); *H01M 4/043* (2013.01); *H01M 4/0471* (2013.01); *H01M 4/1391* (2013.01); *H01M 4/505* (2013.01); *H01M 4/525* (2013.01); *H01M 4/62* (2013.01); *H01M 4/628* (2013.01); *H01M 10/0525* (2013.01); *H01M 4/366* (2013.01); *H01M 2004/028* (2013.01); *H01M 2220/10* (2013.01); *H01M 2220/20* (2013.01)

(58) Field of Classification Search
CPC ........ H01M 4/505; H01M 4/525; H01M 4/62; H01M 10/0525; H01M 4/131; H01M 4/1391; H01M 4/0471; H01M 4/043; H01M 4/0402; H01M 4/628; H01M 4/366; H01M 2004/028; H01M 2220/20; H01M 2220/10
See application file for complete search history.

(56) References Cited

U.S. PATENT DOCUMENTS

| | | | |
|---|---|---|---|
| 2009/0087362 A1 | 4/2009 | Sun et al. | |
| 2010/0301284 A1* | 12/2010 | Suzuki ................... | H01G 11/46 252/520.1 |
| 2011/0076556 A1 | 3/2011 | Karthikeyan et al. | |
| 2011/0219607 A1* | 9/2011 | Nanjundaswamy ... | C01G 45/02 29/623.1 |
| 2013/0071745 A1* | 3/2013 | Mun ................... | H01M 4/1315 429/219 |
| 2014/0113194 A1 | 4/2014 | Tsunozaki et al. | |
| 2014/0147740 A1 | 5/2014 | Kokubu et al. | |
| 2014/0242463 A1 | 8/2014 | Song et al. | |

FOREIGN PATENT DOCUMENTS

| | | |
|---|---|---|
| CN | 102598371 A | 7/2012 |
| JP | 2008536285 A | 9/2008 |
| JP | 2010277929 A | 12/2010 |
| KR | 20060109305 A | 10/2006 |
| KR | 20080099132 A | 11/2008 |
| KR | 20130033154 A | 4/2013 |
| WO | 2012176902 A1 | 12/2012 |
| WO | 2013018692 A1 | 2/2013 |

OTHER PUBLICATIONS

Yun, Su Hyun et al., "The electrochemical property of ZrFx-coated Li [Ni1/3Co1/3Mn1/3]O2 cathode material" Journal of Power Sources, Nov. 13, 2009 (e-pub), vol. 195, pp. 6108-6115.
International Search Report for Application No. PCT/KR2014/007255 dated Nov. 19, 2014.
Yun, Su Hyun, et al., "Enhanced Electrochemical Property of Surface Modified Li[Co1/3Mn1/3]O2 by ZrFx Coating." Bull. Korean Chem. Soc. 2010, vol. 31, No. 2, pp. 355-359.

* cited by examiner

*Primary Examiner* — Muhammad S Siddiquee
(74) *Attorney, Agent, or Firm* — Lerner, David, Littenberg, Krumholz & Mentlik, LLP

(57) ABSTRACT

Disclosed are a cathode active material and a lithium secondary battery including the same, and a method of manufacturing the cathode active material, the method including:
(a) manufacturing a lithium metal oxide according to formula 1 below:

$$Li_{1+z}Ni_aMn_bCo_{1-(a+b)}O_2 \quad (1)$$

wherein $0 \leq z \leq 0.1$, $0.1 \leq a \leq 0.8$, $0.1 \leq b \leq 0.8$ and $a+b<1$;
(b) dry mixing the lithium metal oxide, and a precursor including zirconium and fluorine; and
(c) changing the precursor including zirconium and fluorine into $ZrO_2$ and substituting some of oxygen (O) anions with F by heat-treatment after dry mixing of step (b),
wherein the cathode active material is coated with $ZrO_2$ and F.

14 Claims, 2 Drawing Sheets

[FIG. 1]
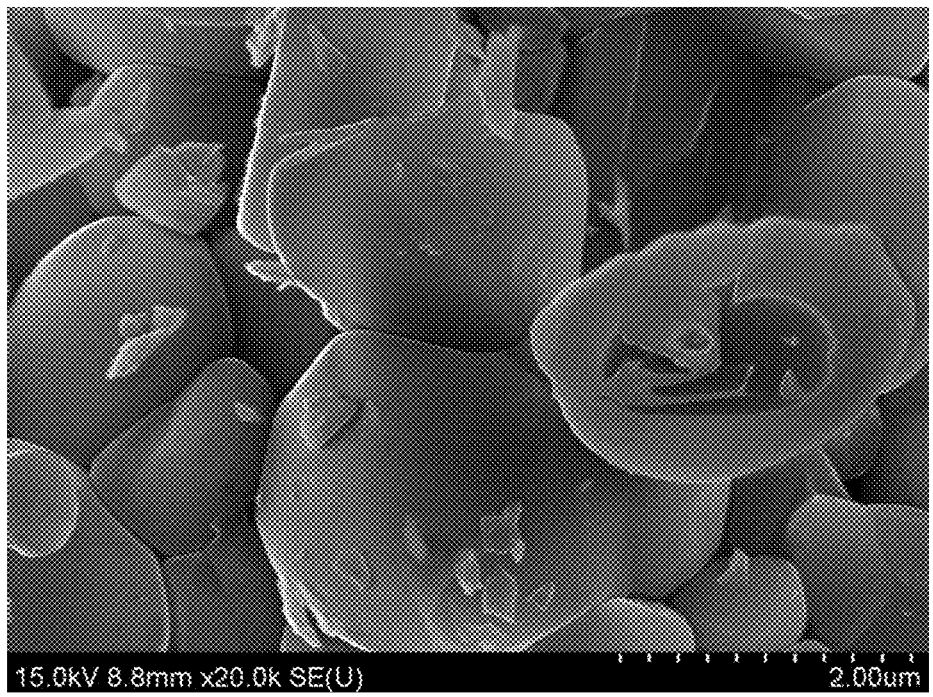

[FIG. 2]
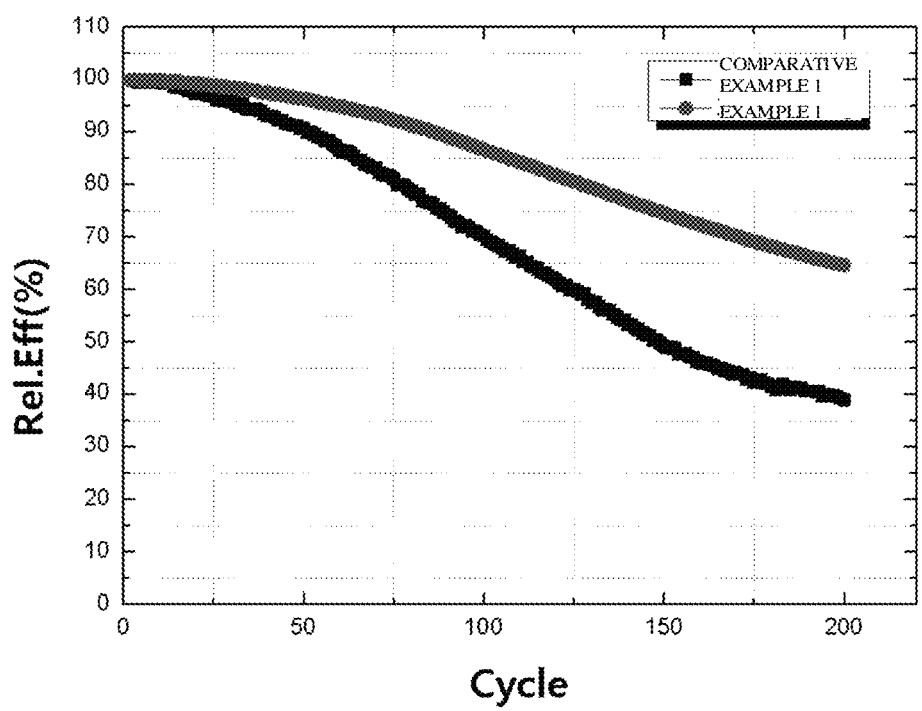

CATHODE ACTIVE MATERIAL AND LITHIUM SECONDARY BATTERY INCLUDING THE SAME, AND METHOD OF MANUFACTURING CATHODE ACTIVE MATERIAL

CROSS-REFERENCE TO RELATED APPLICATION

The application is a national phase entry under 35 U.S.C. § 371 of International Application No. PCT/KR2014/007255, filed Aug. 6, 2014, which claims priority to Korean Application No. 10-2013-0099400, filed Aug. 22, 2013, the disclosures of which are incorporated herein by reference.

TECHNICAL FIELD

The present invention relates to a cathode active material and a lithium secondary battery including the same, and a method of manufacturing the cathode active material. More particularly, the present invention relates to a method of manufacturing the cathode active material coated with $ZrO_2$ and F including manufacturing a predetermined lithium metal oxide, dry mixing a precursor containing the lithium metal oxide, zirconium and fluorine, and changing a precursor containing zirconium and fluorine into $ZrO_2$ and substituting some oxygen (O) anions with F by heat-treatment after the dry mixing.

BACKGROUND ART

Lithium secondary batteries, which exhibit high energy density and operating potential, have long cycle lifespan and low self-discharge rate. Due to such characteristics, lithium secondary batteries are broadly used in mobile devices, and medium and large-scale devices such as electric vehicles (EVs), hybrid electric vehicles (HEVs), power storage devices and the like.

As cathode active materials of lithium secondary batteries, lithium-containing cobalt oxides such as $LiCoMO_2$ are mainly used. Besides the lithium-containing cobalt oxides, use of lithium-containing nickel oxides such as $LiNiMO_2$, lithium manganese oxides such as $LiMnMO_2$ having layered structures and lithium manganese oxides such as $LiMn_2MO_4$ having a spinel structure is being considered. Recently, $LiMO_2$ where M is Co, Ni and Mn is being used.

During a synthesis process, a large amount of Li by-products is generated on a surface of the $LiMO_2$ where M is Co, Ni and Mn. Most of the Li by-products consist of $Li_2CO_3$ and LiOH, and, as such, a cathode paste may be gelated during a cathode paste manufacturing process and, after manufacturing an electrode, gas may be generated by charging and discharging.

Meanwhile, in lithium secondary batteries, an electrolyte is an essential element as an intermediate for ion delivery. The electrolyte generally consists of a solvent and a lithium salt. As such, $LiBF_4$, $6LiPF_6$ and the like as lithium salts are mainly used in view of solubility, chemical stability and the like. However, an electrolyte manufactured by dissolving a lithium salt including fluorine (F) as described above reacts with a small amount of water in the electrolyte and, as such, hydrofluoric acid (HF) is generated and the generated hydrofluoric acid may decompose an electrode.

In addition, lithium carbonate ($Li_2CO_3$) is not eluted in a water-insoluble and pure solvent and exists stably. However, when lithium carbonate ($Li_2CO_3$) is reacted with hydrofluoric acid (HF), the lithium carbonate ($Li_2CO_3$) is eluted in an electrolyte and thereby carbon dioxide ($CO_2$) is generated. Accordingly, a large amount of gas is generated during storage and cycling. As a result, swelling of batteries may be induced and high temperature stability may be deteriorated.

DISCLOSURE

Technical Problem

Therefore, the present invention has been made to solve the above and other technical problems that have yet to be resolved.

In particular, an object of the invention aims is to provide a method of manufacturing a cathode active material having superior stability and cycle characteristics by preventing contact of impurities ($Li_2CO_3$ and LiOH) present on a surface of a cathode active material and hydrofluoric acid (HF) in an electrolyte through a $ZrO_2$ and F coating layer, and generating a stable material through $ZrO_2$ reacting with the hydrofluoric acid (HF) in the electrolyte.

Another object of the present invention is to provide a cathode active material having a new structure manufactured according to the method.

Technical Solution

In accordance with one aspect of the present invention, provided is a method of manufacturing a cathode active material including:

(a) manufacturing a lithium metal oxide according to formula 1 below:

$$Li_{1+z}Ni_aMn_bCo_{1-(a+b)}O_2 \qquad (1)$$ 

wherein $0 \leq z \leq 0.1$, $0.1 \leq a \leq 0.8$, $0.1 \leq b \leq 0.8$ and $a+b<1$;

(b) dry mixing the lithium metal oxide, and a precursor including zirconium and fluorine; and (c) changing the precursor including zirconium and fluorine into $ZrO_2$ by heat-treatment after dry mixing of step (b) and substituting some of oxygen (O) anions with F. Therefore, the present invention provides a cathode active material coated with $ZrO_2$ and F.

A $ZrO_2$ and F film formed according to the manufacturing method of the present may prevent contact of impurities ($Li_2CO_3$ and LiOH) existing on a surface of the cathode active material and hydrofluoric acid (HF) in an electrolyte. In addition, the $ZrO_2$ film may react with the hydrofluoric acid (HF) in the electrolyte and thereby stable $ZrO_2 \cdot 5HF \cdot H_2O$ may be formed. Accordingly, the surface of the cathode active material may be stabilized.

Accordingly, the cathode active material manufactured according to the present invention may prevent that a structure of the cathode active material collapses due to contact with an electrolyte. In addition, the cathode active material may suppress generation of carbon dioxide by side reaction. Accordingly, stability of a lithium secondary battery including the cathode active material may be improved due to minimized swelling. In addition, cycle characteristics of the lithium secondary battery including the cathode active material may be improved.

In the lithium metal oxide of Formula 1, the amount (a) of nickel and the amount (b) of manganese may be particularly 0.1 or more and 0.8 or less, respectively. More particularly, the lithium metal oxide of Formula 1 may be $Li_1Ni_{1/3}Mn_{1/3}Co_{1/3}O_2$ or $LiNi_{0.5}Mn_{0.3}Co_{0.2}O_2$.

Such lithium transition metal oxide particles may be prepared according to methods publicly known in the art such as solid-state reaction, co-precipitation and the like. Detailed descriptions of these methods are omitted.

In the manufacturing method of the present invention, the precursor including zirconium and fluorine is not specifically limited so long as Zr and F may be provided. In particular, the precursor including zirconium and fluorine may be $ZrF_4$.

In a specific embodiment, the amount of the lithium transition metal oxide mixed may be controlled such that the amount of $ZrO_2$ and F coated on the lithium transition metal oxide of step (b) is 0.001 to 0.100 wt % based on the total weight of the cathode active material. In particular, the amount of $ZrO_2$ and F may be 0.001 to 0.010 wt % based on the total weight of the cathode active material.

When the amount of the $ZrO_2$ and F is too small, it is difficult to obtain desired effects. On the contrary, when the amount of the $ZrO_2$ and F is too great, specific capacity may be reduced.

The dry mixing of step (b) may be carried out by, for example, simple mixing or high-energy milling. Especially, the high-energy milling may be accomplished using, namely, a Mechanofusion device or a Nobilta device. By using the Mechanofusion device, a mixture is formed through strong physical rotational force in a dry state and electrostatic binding strength is formed among constituting materials.

The heat-treating may be carried out, for example, a temperature of 400 to 1000 □ for 4 to 10 hours under an atmosphere. Through the heat-treating, the precursor including zirconium and fluorine is changed to $ZrO_2$ and some of the oxygen (O) anions are substituted with F. As a result, a lithium transition metal oxide coated with $ZrO_2$ and F may be manufactured.

A temperature range of the heat-treating is an optimal range to obtain the desired cathode active material of the present invention. When a heat-treating temperature is too low or high, problems such as impurities, crystal binding, sample brokenness and the like may occur.

The present invention also provides a cathode active material for secondary batteries coated with $ZrO_2$ and F manufactured according to the manufacturing method.

The thickness of the coating layer may be particularly 0.01 to 0.1 μm, more particularly 0.01 to 0.05 μm. When the thickness of the coating layer is too thin, contact with an electrolyte may not be prevented or batteries may be damaged during a battery working step. On the contrary, when the thickness of the coating layer is too thick, specific capacity may be reduced.

A coating area of $ZrO_2$ and F may be, for example, 60 to 100%, particularly 80 to 100% based on a surface area of a cathode active material. When an area of the coating layer is too small, a contact area of the cathode active material and the electrolyte may be extended.

The present invention also provides a cathode mix for secondary batteries including the cathode active material described above and a cathode for secondary batteries coated with the cathode mixture.

The cathode mix may selectively include a conductive material, a binder, a filler and like besides the cathode active material.

The conductive material is typically added in an amount of 1 to 30 wt % based on the total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 30 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The cathode according to the present invention may be manufactured by drying and pressing the coated collector after coating a slurry manufactured by mixing the cathode mix including the compounds described above with a solvent such as NMP or the like in a cathode collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a lithium secondary battery including the cathode, an anode, a separator and a lithium salt-containing non-aqueous electrolyte.

The anode is manufactured, for example, by drying after coating an anode mix including an anode active material on an anode collector. In this case, as desired, the anode mix may include elements described above.

Examples of the anode active material include, for example, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is generally fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel that is surface-treated with carbon, nickel, titanium, silver, or the like, or an aluminum-cadmium alloy. In addition, similarly to the cathode current collector, the anode current collector may have fine irregularities at a surface thereof to increase adhesion between the anode active material and the anode current collector. In addition, the anode current collector may be used in any of various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte consists of an electrolyte and a lithium salt. The electrolyte may be a non-aqueous organic solvent, an organic solid electrolyte, an inorganic solid electrolyte, or the like.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The secondary battery according to the present invention may be used in a battery cell used as a power source of small devices and may also be used as a unit cell of a medium and large-scale battery module including a plurality of battery cells.

The present invention also provides a battery pack including the battery module as a power source of a medium and large-scale device. Examples of the medium and large-scale device include, but are not limited to, electric vehicles (EVs), hybrid EVs (HEVs), and plug-in HEVs (PHEVs); and devices for storing power.

Effects of the Invention

As described above, a method of manufacturing a cathode active material according to the present invention includes heat-treating after dry mixing a precursor including zirconium and fluorine, an a lithium transition metal oxide. $ZrO_2$ and F are coated on a surface of the cathode active material manufactured according the method and, as such, $ZrO_2$ and F are reacted with hydrofluoric acid (HF) in an electrolyte, resulting in generation of a stable material.

Accordingly, collapse of a cathode active material structure and generation of carbon dioxide as a side reaction product, due to contact with an electrolyte, may be suppressed. In addition, a lithium secondary battery including the cathode active material of the present invention has increased stability due to minimized swelling events and improved cycle characteristics.

BRIEF DESCRIPTION OF THE DRAWINGS

The above and other objects, features and other advantages of the present invention will be more clearly understood from the following detailed description taken in conjunction with the accompanying drawing, in which:

FIG. 1 is an electron microscope image of a transition metal oxide obtained according to one example of the present invention; and FIG. 2 is a graph showing lifespan characteristics according to Experimental Example 1.

BEST MODE

Now, the present invention will be described in more detail with reference to the following examples. These examples are provided only for illustration of the present invention and should not be construed as limiting the scope and spirit of the present invention.

Example 1

As a ternary system lithium transition metal oxide, $Li_{1+z}Ni_aMn_bCo_{1-(a+b)}O_2$ where $0 \leq z \leq 0.1$, $0.1 \leq a \leq 0.8$, $0.1 \leq b \leq 0.8$ and $a+b<1$ was used. After mixing $Li_{1+z}Ni_aMn_bCo_{1-(a+b)}O_2$ with 0.01 to 0.20 wt % $ZrF_4$, the mixture was heat-treated at a temperature of 300 to 700 □ for 3 to 10 hours. As shown in FIG. 1, ZrF coated on a surface of the cathode active material was synthesized.

The cathode active material, a conductive agent and a binder were used in a ratio of 95:2.5:2.5 to prepare a slurry and the slurry was coated onto an Al-foil having a thickness of 20 μm to manufacture a coin type battery. As an anode, Li-metal was used. As an electrolyte, 1 M LiPF$_6$ including a mixture of EC:EMC:DEC of 1:2:1 was used.

Comparative Example 1

A cathode and a coin type battery were manufactured in the same manner as in Example 1, except that a lithium metal oxide represented by LiNi$_{3/5}$Mn$_{1/5}$Co$_{1/5}$O$_2$ as a lithium transition metal oxide was used such that ZrF was not coated on a surface of the cathode active material.

Experimental Example 1

Lifespan characteristics of batteries manufactured according to Example 1 and Comparative Example 1 were analyzed by performing 200 cycles at 45 □. Results are illustrated in FIG. 2.

As results of experiments, the battery of Example 1 according to the present invention showed greatly improved lifespan characteristics, when compared with the battery of Comparative Example 1, as illustrated in FIG. 2. Namely, it was confirmed that lifespan and capacity characteristics of a battery were dramatically improved due to a coating layer of a battery surface.

Those skilled in the art will appreciate that various modifications, additions and substitutions are possible, without departing from the scope and spirit of the invention as disclosed in the accompanying claims.

The invention claimed is:

1. A method of manufacturing a cathode active material for secondary batteries, the method comprising:
manufacturing a lithium metal oxide according to formula 1 below:

$$Li_{1+z}Ni_aMn_bCO_{1-(a+b)}O_2 \qquad (1)$$

wherein 0≤z≤0.1, 0.1≤a≤0.8, 0.1≤b≤0.8 and a+b<1;
dry mixing the lithium metal oxide and a precursor comprising zirconium and fluorine; and
changing the precursor comprising zirconium and fluorine into ZrO$_2$ and substituting some of oxygen (O) anions with F, by heat-treatment after the dry mixing,
wherein the cathode active material is coated with ZrO$_2$ and F, and in the dry mixing, an amount of a lithium transition metal oxide mixed with the precursor is controlled such that a total amount of ZrO$_2$ and F coated on the lithium transition metal oxide is 0.001 to 0.100 wt % based on the total weight of the cathode active material.

2. The method according to claim 1, wherein the lithium metal oxide of Formula 1 is Li$_1$Ni$_{1/3}$Mn$_{1/3}$Co$_{1/3}$O$_2$ or LiNi$_{0.5}$Mn$_{0.3}$Co$_{0.2}$O$_2$.

3. The method according to claim 1, wherein the precursor comprising zirconium and fluorine is ZrF$_4$.

4. The method according to claim 1, wherein an amount of the mixed lithium transition metal oxide is controlled such that a total amount of ZrO$_2$ and F is 0.001 to 0.010 wt % based on a total weight of the cathode active material.

5. The method according to claim 1, wherein the dry mixing is carried out by high energy milling.

6. The method according to claim 1, wherein the heat-treating is carried out at 400 to 1000° C. for 4 to 7 hours.

7. A cathode active material for secondary batteries coated with ZrO$_2$ and F manufactured using the method according to claim 1.

8. The cathode active material according to claim 7, wherein ZrO$_2$ and F are coated to a thickness of 0.01 to 0.10 μm.

9. The cathode active material according to claim 7, wherein an area coated with ZrO$_2$ and F is 60 to 100% based on a surface area of the cathode active material.

10. A cathode mix comprising the cathode active material according to claim 7.

11. A cathode for secondary batteries comprising the cathode mix according to claim 10 coated on a collector.

12. A lithium secondary battery comprising the cathode for the secondary batteries according to claim 11.

13. The lithium secondary battery according to claim 13, wherein the lithium secondary battery is a unit cell of a battery module as a power supply of a medium and large-scale device.

14. The lithium secondary battery according to claim 14, wherein the medium and large-scale device is an electric vehicle, a hybrid electric vehicle, a plug-in hybrid electric vehicle, or a system for storing power.

* * * * *